UNITED STATES PATENT OFFICE.

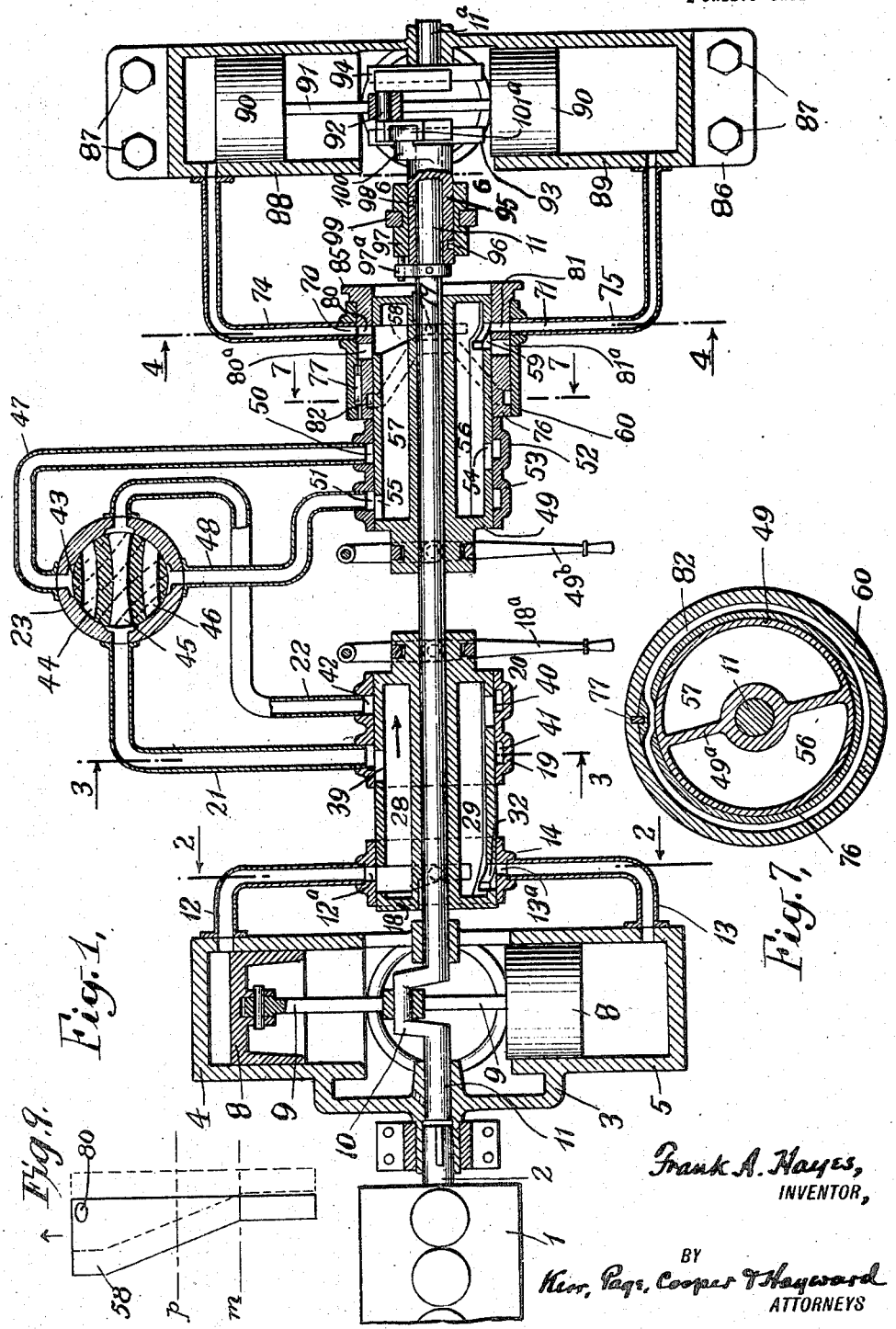

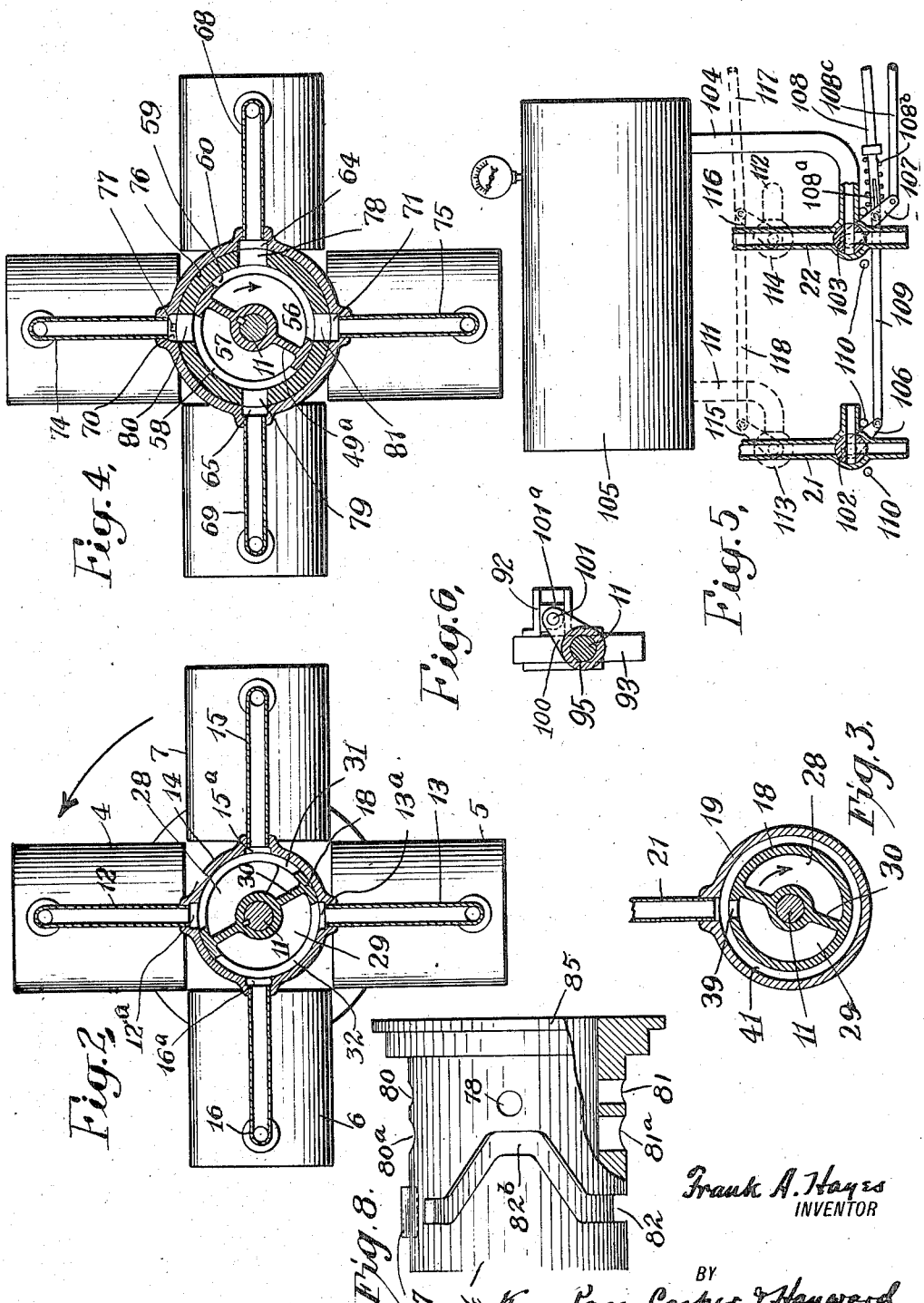

FRANK A. HAYES, OF PELHAM MANOR, NEW YORK.

VARIABLE-SPEED POWER-TRANSMISSION MECHANISM.

1,229,076.  Specification of Letters Patent.  Patented June 5, 1917.

Substitute for application Serial No. 754,798, filed March 17, 1913. This application filed March 12, 1915. Serial No. 13,864.

*To all whom it may concern:*

Be it known that I, FRANK A. HAYES, a citizen of the United States, residing at Pelham Manor, in the county of Westchester and State of New York, have invented certain new and useful Improvements in Variable-Speed Power-Transmission Mechanisms, of which the following is a full, clear, and exact description.

This invention relates to fluid transmission mechanisms, particularly such as are used with motor vehicles. One object of the invention is to provide a mechanism of this character which has a maximum efficiency when working at the usual running speeds. Another object of the invention is to eliminate all extraneous moving parts at full speed. A further object is to provide a fluid transmission mechanism in which the normally operating parts thereof may at times act as a fluid clutch, fluid brake or self starter for the engine.

Still further objects and advantages will more fully appear from the detailed description and the features of novelty in construction and combination of parts will be particularly pointed out in the claims.

In the accompanying drawings,

Figure 1 is a sectional view illustrating diagrammatically one form of construction in which my invention may be carried out.

Figs. 2, 3 and 4 are sections taken respectively along lines 2—2, 3—3 and 4—4, of Fig. 1, looking in the directions indicated by the arrows.

Fig. 5 illustrates diagrammatically the connections which may be used for self-starting.

Fig. 6 is a detail sectional view of the motor-crank adjusting mechanism, on line 6—6 of Fig. 1.

Fig. 7 is a detail section on line 7—7 of Fig. 1.

Fig. 8 is a side view of a part of one of the valves, showing the passage by which two of the motors can be by-passed.

Fig. 9 is a diagrammatic view illustrating the operation of certain valves.

The four cycle internal combustion engine which is now in common use on motor vehicles is essentially a high speed motor which is not reversible and cannot start, or run, at low speed, under load. It is, therefore, necessary to provide a transmission gear through which the low, intermediate and reverse speeds may be transmitted to the running wheels of the vehicle. The ordinary forms of transmission gear consisting of toothed gears are not entirely satisfactory for the reason that they transmit only fixed speeds and no gradual increase of speed can be obtained. It has been proposed, therefore, to use a fluid transmission consisting of a pump driven by the engine and a motor driven by the fluid pressure generated in the pump, and means whereby the displacement per revolution of the fluid in the pump, or motor, or both pump and motor may be varied. This displacement is usually varied by adjusting the throw of the crank of the pump or motor, or by adjusting the throw of the cranks of both pump and motor. Thus, when it is desired to start the vehicle from rest, the motor crank is adjusted to the maximum throw while the pump crank is adjusted to minimum throw. In order to supply to the motor the fluid required for one revolution, the pump has to rotate through several revolutions and thus the speed of the motor is considerably reduced below the speed of the pump and a low speed is consequently imparted to the vehicle. At the same time, however, a maximum torque or tractive effort is exerted at such low speed by reason of the large displacement of fluid per revolution of the motor as compared with the pump; or, looking at it from another point of view, the motor exerts an increased torque upon the transmission shaft by reason of the large throw of its crank as compared with the throw of the pump crank.

This form of transmission is ideal in the sense that an indefinite number of speeds may be obtained ranging from rest up to the maximum speed of the engine or even higher speeds, although the latter are generally not desirable. Also the vehicle may be readily reversed by simple manipulation of the valve or by adjusting the crank over to the other side of the shaft axis. However, the difficulty with this transmission is that at the maximum speed of the vehicle both the motor and pump are working at maximum speed, and therefore, the motor and pump losses are at a maximum at that time, consequently detracting from the efficiency of the transmission. Moreover, the constant wear materially shortens the life of the apparatus.

To overcome this difficulty, I have provided a fluid transmission in which the pump is so connected with respect to the engine shaft and transmission shaft that at low speeds it pumps the fluid to the motor substantially in the same manner as in the type of fluid transmission above described, obtaining the high torque desirable at such speeds. However, at all forward speeds, the pump itself exerts a direct torque upon the transmission shaft in addition to the torque of the motor. Moreover, when it is desired to drive the vehicle at high speed, the pump may be coupled directly to the transmission shaft, so as to act as a fluid clutch while the motor crank may be adjusted to no-throw position, thus practically putting the pump and motor out of operation at such speed of the vehicle, and obtaining a direct positive drive without any relative motion of the transmitting elements. I have also provided additional means whereby the speed of the motor may be increased by cutting out of operation some of the motor cylinders. Thus in order to maintain the same rate of displacement with fewer cylinders in operation the number of revolutions per minute of the motor must increase.

Referring to the diagrammatic illustration of my invention in Figs. 1 to 6, as applied to a four cylinder motor and pump, the shaft 2 of the engine 1 is keyed or otherwise positively coupled to the cylinder casing 3 of the pump. The latter carries opposed cylinders 4, 5, 6 and 7 in which work pistons 8 connected by connecting rods 9 with the crank 10 of the transmission shaft 11. The crank preferably has a constant throw; however, it may be arranged for variable throw without departing from my invention. The ends of the opposed cylinders 4 and 5 are connected through passages 12 and 13 with a ring 14, and the opposed cylinders 6 and 7 are similarly connected with the ring 14 through passages 15 and 16. The ring is loosely mounted with a snug fit upon a drum 18 which is keyed or otherwise secured to the transmission shaft 11. Suitable ports are formed in the ring and drum for transmitting respectively pressure and suction to two stationary rings 19 and 20 also mounted upon the drum and connected by ducts 21 and 22 to the casing 23 of a controlling valve. These ducts open into the valve casing preferably at diametrically opposite points, for a purpose hereinafter to be described.

I have illustrated the ring 14 as formed with two ports $12^a$, $13^a$, diametrically opposite each other and communicating respectively with the ducts 12 and 13. The drum 18 is formed with two compartments or chambers 28 and 29 separated by a web or partition wall 30. Diametrically opposed circumferential slots 31 and 32 are formed in the periphery of the drum, the upper of which, in the position illustrated in Figs. 1 and 2, communicates pressure to the compartment 28 and the lower aperture or slot 32 transmits suction through the compartment 29. The ports $15^a$, $16^a$, in the ring 14 are midway between the ports $12^a$, $13^a$, to correspond with the disposition of the cylinders 6 and 7 with which said ports $15^a$, $16^a$, communicate through the ducts 15, 16. The compartments 28 and 29 are provided with suitable outlets 39 and 40 spaced longitudinally with reference to each other, so as to communicate with the rings 19 and 20. The latter are formed with continuous circumferential passages 41 and 42 completely encircling the drum as clearly appears from Fig. 3. It will thus be seen that when the cylinder casing 3 is rotated in the direction of the arrow (Figs. 2 and 3) at a higher speed than the transmission shaft 11, suction will be transmitted to the duct 22 and pressure will be transmitted to the duct 21.

This pressure and suction of the pump may be transmitted to the motor through the following connections: A rotary valve plug 43 is mounted in the valve casing 23, and has passages 44, 45 and 46 extending therethrough. The extremities of the passage 44 and likewise the extremities of the passage 46 are spaced 90° on the periphery of the valve plug, whereas the passage 45 extends diametrically through the same. When the valve plug is turned 45° to the right, to the position indicated in dotted lines, the duct 21 communicates with a duct 48 and the duct 22 communicates with a duct 47, both these ducts 47 and 48 being disposed preferably at diametrically opposite points about the valve casing 23 and 90° from the ducts leading to the pump valve. The motor valve consists of a drum 49, similar in construction to the drum 18 forming the pump valve, and is similarly fixed to the shaft 11. The ducts 47 and 48 terminate in annular passages 50 and 51 formed respectively in rings 52 and 53 encircling the drum and communicating through diametrically opposed longitudinally spaced apertures 54 and 55 formed in the periphery of the drum 49 with the compartments or chambers 56 and 57 into which this drum is divided by a web or partition wall $49^a$.

For conveying the pressure and suction from the compartments 57 and 56 of the valve drum 49, the periphery of the latter is pierced to form diametrically opposed circumferential outlet apertures or slots 58 and 59 to communicate with ports in a ring 60. This ring is substantially of the same construction as the ring 14 of the pump valve. Thus the ring 60 (Fig. 4) is formed with two ports 64 and 65, leading through ducts 68 and 69 to two of the motor cylinders, and with intermediate ports 70 and 71 leading to the motor cylinders 88, 89, through ducts 74 and 75.

I have provided means for by-passing two of the cylinders, for example two of the motor cylinders, so as to decrease the displacement of the motor per revolution and thus increase its speed. This means may consist of a sleeve 76 slidable upon the drum but feathered to the ring 60, as by a feather 77. This sleeve is formed with narrow diametrically opposed perforations 78 and 79 (Figs. 1 and 4) registering with the ports 64, 65 in the ring 60 and is provided also with perforations or slots 80 and 81 registering with the ports 70, 71, of the ring. The sleeve is provided with a peripheral channel 82, Figs. 1, 4, 7 and 8, which at the top passes under the feather 77 but elsewhere is in the outer surface of the sleeve. At the top and bottom the passage 82 lies alongside of and to the left of the ports 80, 80$^a$, 81, 81$^a$, but it is curved or offset, as indicated in Figs. 1 and 8, into proximity to the narrow ports 78, 79, which normally (that is, when the sleeve is at its leftward position, as in Fig. 1) register with ports 64, 65, as in Fig. 4. The sleeve is feathered to the stationary ring 60 so as not to rotate with the valve drum 49, but may be shifted axially (toward the right in Fig. 1) by any suitable means, not shown, connected with the flange 85, thereby shifting the ports 78 and 79 out of register with the slots 58, 59, in the drum 49, and ports 64, 65 in the ring 60, and bringing the curved or offset portions, as 82$^b$, Fig. 8, of the passage 82, into register with said ports 64, 65. The ducts 68 and 69 are thus brought into communication through the passage 82 and the opposed cylinders of the motor that are connected with said ducts are accordingly by-passed. That is, fluid displaced from one cylinder simply flows into the other, and vice versa, and neither receives fluid from or delivers fluid back to the pump. While the sleeve is so shifted, the axially elongated ports or slots 80$^a$ and 81$^a$, alongside of ports 80 and 81 respectively, always permit communication through the slots 58 and 59 of the drum and the ports 70, 71, in the ring 60.

The motor is of substantially the same construction as the pump, but its casing 86 is fixed in any suitable manner, as by bolts 87, to some suitable stationary support, not shown. The pressure and suction are transmitted through the ducts 68, 69, 74, 75 above described to the opposed motor cylinders 88, 89, etc., in which reciprocate the pistons 90 connected by connecting rods 91 to an adjustable crank 92 mounted upon the transmission shaft.

Any suitable mechanism may be employed for adjusting the motor crank. I have illustrated this crank in the form of a slidable U mounted on guides formed by transverse arms 93 and 94 which extend from the transmission shaft 11 and from an extension 11$^a$ thereof. Loosely mounted upon the transmission shaft adjacent to the crank is a sleeve 95 having a spiral groove 96 formed on its periphery. A second sleeve 97, feathered to the thrust collar 97$^a$ on the shaft 11, is mounted upon the sleeve 95 and is provided with a pin 98 engaging the groove 96 in sleeve 95. A collar 99 is mounted in a groove in the sleeve 97 by which collar the sleeve 97 may be shifted longitudinally. Such a shift causes the sleeve 95 to rotate with reference to the transmission shaft. Through the medium of the arm 100, connected by a pin 101 to a block 101$^a$ (Fig. 6) slidably engaging a slot in the side of the crank 92, the described rotation of the sleeve 95 adjusts the crank toward and from the axis of the shaft so as to diminish or increase its throw, as the case may be.

When the vehicle is at rest, and also at the lowest forward speeds, the motor crank 92 is adjusted to its maximum throw and the sleeve 76 is at its leftward position so as to connect all of the motor cylinders with the control valve as shown in Fig. 1. When the vehicle is at rest, the plug 43 is in the position illustrated in Fig. 1, wherein the ducts 47 and 48 leading to the motor valve are choked and the ducts 21 and 22 from the pump valve freely intercommunicate, thus by-passing the pump. The transmission shaft 11 is then held stationary, the motor at this time acting as a fluid brake while the pump merely causes the fluid to surge back and forth between its cylinders.

To start the vehicle forward, the valve plug 43 is turned slightly to the right (clockwise) admitting a portion of the fluid of the pump into the ducts 47 and 48, and allowing the rest of the fluid to by-pass as previously described. This movement of the valve is continued so as to admit more and more of the fluid into the motor ducts until the valve assumes a position indicated in dotted lines in Fig. 1. Full suction is then transmitted through the rotary valve 18 to the duct 22, through the passage 44 in the valve plug 43, through the duct 47 and thence alternately through chamber 56 of the motor valve to the ducts 68, 69, 74 and 75 leading to the motor cylinders. Similarly pressure is exerted through the rotary valve 18, the duct 21, passage 46 in the valve plug, duct 48, through the chamber 57 of the rotary valve 49, and then transmitted alternately through the ducts 68, 69, 74 and 75 to the corresponding motor cylinders. The vehicle is then driven at low speed, the speed ratio depending upon the relative throws of the pump and motor cranks, and upon the relative piston areas of the pump and motor.

To increase the speed of the motor the throw of the crank is decreased to any suitable practical limit and then a certain number of motor cylinders may be by-passed, as by shifting the sleeve 76, as previously described.

To drive at full speed, the valve plug 43 is adjusted at right angles to the position illustrated in Fig. 1. In such position, the motor is by-passed and the pump is choked, thus positively coupling the latter to the transmission shaft and the motor being then driven as a pump to idly circulate the fluid between its cylinders. The crank 92 may then be further adjusted to no-throw position, whereupon the moving parts on the motor are rendered stationary and the transmission shaft is driven from the motor with a positive direct drive without causing any idle motion of extraneous parts.

For reverse drive, the valve plug 43 is adjusted to a position at 45° to the left (counterclockwise) from that shown in full lines in Fig. 1. This changes the duct 48 to the suction duct and the duct 47 to the pressure duct, thus reversing the operation of the motor valve and thereby reversing the motor.

In a practical construction, the motor crank may be readily adjusted from twice the throw of the pump crank down to a position of no-throw. When the valve is at 45° as above assumed, the motor will be driven at speeds varying from one-third of the engine speed with the former adjustment clear up to full engine speed with the latter adjustment of the motor crank. This will be evident from the following:

If $R$ = rate of displacement per minute of fluid in pump,
$R'$ = rate of displacement per minute of fluid in motor,
$D$ = displacement of fluid per revolution of pump,
$D'$ = displacement of fluid per revolution of motor,
$N$ = revolution per minute of pump casing,
$N'$ = revolution per minute of motor and pump crank, and hence, transmission shaft, (1) $R = R'$ because all fluid which passes through pump passes through motor.

(2) $R = D(N-N')$ because the effective pumping revolutions are those in excess of revolutions of transmission shaft.

(3) $R = D'N'$

In view of (1)
$$D'N' = D(N-N')$$
or
$$D'N' = DN - DN'$$
$$D'N' + DN' = DN$$
$$N'(D'+D) = DN$$

(4) $N' = \dfrac{ND}{D'+D}$

If we assume that the pump and motor have the same number of cylinders and equal piston areas, the displacements of the pump and motor will be proportional to the throw of their respective cranks. Therefore, if the maximum throw of the motor crank is twice the throw of the pump crank, $D'$ equals $2D$. Substituting this value of $D'$ in equation (4), we get $N'$ equals $(\frac{1}{3})N$ for low speed.

If the throw of the motor crank is then decreased until it equals the throw of the pump crank, then $D'$ equals $D$ and substituting this value of $D'$ in equation (4) we get $N'$ equals $(\frac{1}{2})N$ or half speed for this adjustment of the motor crank. When the crank is adjusted to a position of no-throw, $N'$ equals $N$, or in other words, the transmission shaft is driven at the same speed with the engine.

To further vary the speed some of the cylinders of the motor can be cut out, and by-passed by means of the sliding sleeve above described. Thus if desired the piston area of the motor may be made one-half the piston area of the pump.

The speed may also be varied by varying the "cut-off" of the motor or the pump and the motor, in conjunction with or independently of adjustment of the motor crank. This will be readily understood when it is remembered that the pistons 90 are reciprocated (to impart rotation to the shaft 11) by fluid delivered through pipes 68, 75, 69, 74, in succession. Referring to Fig. 4, it will be seen that fluid will be delivered from chamber 56 through ports 59, 81, and 71, to pipe 75, so long as port 59 is in register with port 81, and that fluid will be discharged from pipe 74 through port 58 as long as it is in register with port 80. If now we shorten (in circumferential extent) the slots or ports 58, 59, Fig. 4, it is clear that the flow of fluid through pipes 75, 74, will be cut off earlier (or begin to flow later) in the cycle. This will reduce the displacement—that is, the volume of fluid moved—by the motor and hence the speed will be increased according to formula (4) above. This earlier cut-off can be secured by inclining one side of the circumferential slots or ports 58, 59, for example as indicated in Fig. 9, which shows slot 58 developed in a plane. Evidently, when the parts are in the position shown in full lines, with the slot 58 moving upward (in the direction of the arrow) the port 80 will not be closed until the lower end of slot 58 has passed it. But if we move slot 58 rightwardly to the position shown in dotted lines the port 80 will be closed by that part of the inclined edge lying between lines m, p, some time before the lower end of the slot reaches the position of port 80. If the slot is moved still farther to the right the port 80 will be closed still earlier in the cycle, by the part of the inclined edge above line p. For this purpose the chambered cylinders 18, 49 are capable of limited sliding movement on the transmission shaft 11, and one side of each of the ports 31, 32, 58, 59 is inclined as indicated. In the arrangement shown, the partition walls 30 and 49ª, which divide the cylinders into chambers or compartments are "skewed" in a helical fashion near or at one end of each, so that the aforesaid ports can have the necessary width and reach and at the same time leave sufficient space between ports 31 and 32, and between ports 58 and 59, to close ports 12ª, 13ª, 15ª, 16ª (Fig. 2), and ports 78, 79, 80, 81 (Fig. 4), at the proper instants, as will be readily understood. Evidently, shifting the cylinders axially, thereby bringing the inclined sides of the revolving ports more and more into, or more and more out of, the planes of the respective stationary ports, varies the time of "cut off." This has, practically, the effect of varying the relative displacements of the pump and motor, thereby producing a change of speed since, as explained above, the speed is a function of the ratio of the pump-displacement to the sum of the two displacements. In general it is sufficient to vary the cut-off of the motor alone, but both can be varied if desired. Any suitable means can be provided for shifting the valve cylinders, as for example levers 18ª, 49ᵇ, connected with actuating devices (not shown) at any position convenient for the operator.

The relative torque of the motor and pump exerted upon the transmission shaft is proportional to the respective displacements of the motor and pump, inasmuch as the fluid pressure is the same for both. This torque will, with equal piston areas, be proportional to the throw of the motor and pump cranks. Thus, at one-third speed, when the throw of the motor crank is twice the throw of the pump crank, the torque of the motor will be twice the torque of the pump, and, therefore, twice the torque of the engine; and at half speed, when the throw of the motor crank is equal to the throw of the pump crank, the torques will also be equal. The torque on the transmission shaft is, however, the sum of these two torques, thus increasing the efficiency over the usual constructions of pump and motor now used.

It will be noted that my improved fluid transmission mechanism takes the place of and includes in its functions that of a clutch, brake and change-speed gear. By using an auxiliary supply of compressed fluid, the pump may be operated as a motor for starting the engine. Thus the function of self-starter may be combined with the other properties of my improved transmission mechanism. All of the adjustments of the transmission as well as the connections for self-starting may be controlled by a single control lever, and, if desired, the throttle of the engine may also be connected to this lever, thus simplifying the entire control of the vehicle substantially to one operating lever. This will be readily understood by those skilled in the art.

In Fig. 5 I have illustrated diagrammatically connections which may be used for adapting the pump to act as a self-starter for the engine. While the transmission shaft is held stationary by the choking of the motor, it will be evident that, should pressure be supplied to the duct 22, and the duct 21 be opened to exhaust, the pump will operate as a motor to start the engine. For this purpose, three way valves 102 and 103 may be formed in the ducts 21 and 22 (Fig. 5); the valve 102, in the adjustment for self-starting illustrated in Fig. 5, opening to exhaust, and the valve 103 leading by a duct 104 into a source of fluid pressure as a storage tank 105, as in Fig. 5, which shows the positions of the valves when the engine is being started. These valves may be operated simultaneously through levers 106 and 107 connected by a link 109 which is in turn connected by a rod 108 and any suitable further connection to a convenient position for control by the operator. Stops 110 may be provided for limiting the movement of the valve levers so as to bring them to the desired adjustment. The link 108 has a slot 108ª for the pin in valve lever 107, with a spring 108ᵇ to hold the lever yieldingly at the left end of the slot, as shown, but permitting manipulation of valve 102 independently of valve 103 for the purpose hereafter explained. It will be understood that as soon as the engine is started the valves 102, 103 are both turned 90° in the clockwise direction.

The pressure tank 105 may, if desired, be replenished by the pump during the time when the engine is running free and the vehicle is stationary. This may be accomplished by connecting the pressure duct 21 through a passage 111 with the pressure tank, while the suction duct 22 is formed with a by-pass 112 leading to a suitable source of fluid supply. Three way valves 113 and 114 having levers 115 and 116 are connected by rod 117 and link 118 to some suitable control device to be manipulated by the chauffeur. Normally the valves 113 and 114 are adjusted so as to allow free passage within the ducts 21 and 22 to the control valve 23 and interrupting communication with the pressure tank and the source of fluid supply. However, when it is desired to charge the tank, these valves 113 and 114 are adjusted so as to close off the ducts 21 and 22 from the valve 23 and open them respectively to the pressure tank and the source of fluid supply as above indicated.

When using a gaseous fluid (usually air) as the energy-transmitting medium, I prefer to have the pressure on low-pressure side of the system higher than atmospheric, as well as on the high-pressure side, as it is thus possible to approximate the advantages of a liquid medium without its disadvantage of practically total lack of compressibility. The compressed gas needed can be drawn from the storage tank 105. For this purpose it is only necessary to have the valve 102 in the running position (90° clockwise from the position shown in Fig. 5), while the valve 103 is in the position shown, the ducts 111 and 112 being closed, the valve plug 43 in the dotted line position, and the engine running. This manipulation of valve 102 without actuating valve 103 is effected by leftward movement of rod 108 while rod 108°, connected to arm 107, is held; such leftward movement of rod 108 being permitted by the yielding of spring 108ᵇ. When sufficient compressed gas has been let into the system, the valve 103 is restored to running position, 90° clockwise from the position shown.

It will be understood that the constructions, combination of parts, and mode of operation, above described, are merely illustrative of my invention. I do not wish to limit myself, therefore, to the specific embodiments herein described; as many changes in such construction, combination of parts and mode of connection will occur to those skilled in the art. I regard such changes to be within my invention, provided they are embraced in the spirit and scope of the appended claims. It is apparent, of course, that the apparatus may be driven from either end.

Having thus described my invention, I claim:

1. In a fluid transmission mechanism, a driving shaft, a transmission shaft, a pump comprising two relatively movable elements, one of said elements being connected to the driving shaft and the other of said elements being connected to the transmission shaft, a motor comprising a stationary element and a relatively movable element, said movable element being operatively connected to the transmission shaft, and valve mechanism for conducting the fluid from the pump to the motor.

2. In a fluid transmission mechanism, a driving shaft, a pump casing coupled thereto, a transmission shaft, an element working in the pump casing connected to the transmission shaft, a stationary motor casing, an element working in said motor casing also connected to the transmission shaft, and valve mechanism for conducting the fluid from the pump to the motor.

3. A fluid transmission mechanism comprising a driving shaft, a pump casing coupled thereto provided with radial cylinders, a transmission shaft having a crank, pistons working in the pump cylinders connected to the crank, a stationary motor casing provided with radial cylinders, a second crank on the transmission shaft, pistons working in the motor cylinders connected to said second crank, and valve mechanism for conducting the fluid from the pump to the motor.

4. A fluid transmission mechanism comprising a driving shaft, a pump casing coupled thereto, provided with cylinders, a transmission shaft having a crank, pistons working in the pump cylinders connected to the crank, a stationary motor casing provided with cylinders, an adjustable crank on the transmission shaft, pistons working in the motor cylinders connected to said adjustable crank, and valve mechanism for conducting the fluid from the pump to the motor.

5. A fluid transmission mechanism comprising a driving shaft, a pump casing coupled thereto, provided with cylinders, a transmission shaft having a crank, pistons working in the pump cylinders connected to the crank, a stationary motor casing provided with cylinders, a second crank on the transmission shaft, pistons working in the motor cylinders connected to said second crank, valve mechanism for conducting the fluid from the pump to the motor, and means for cutting out of the fluid circuit some of the cylinders.

6. A fluid transmission mechanism comprising a driving shaft, a pump casing coupled thereto, a transmission shaft having a crank, pistons working in the pump cylinders connected to the crank, a stationary motor casing provided with cylinders, an adjustable crank on the transmission shaft, pistons working in the motor cylinders connected to said adjustable crank, valve mechanism for conducting the fluid from the pump to the motor, and means for cutting out of the fluid circuit some of the cylinders.

7. A fluid transmission mechanism comprising a driving shaft, a pump casing coupled thereto, provided with cylinders, a transmission shaft having a crank, pistons working in the pump cylinders connected to the crank, a stationary motor casing provided with cylinders, a second crank on the transmission shaft, pistons working in the motor cylinders connected to said second crank, valve mechanism for conducting the fluid from the pump to the motor, and means for cutting out of the fluid circuit a pair of opposing cylinders and also by-passing the same.

8. In a fluid transmission mechanism, a driving shaft, a transmission shaft, a pump comprising two relatively movable elements, one of said elements being connected to the driving shaft and the other of said elements being connected to the transmission shaft, a motor comprising a stationary element and a relatively movable element, said movable element being operatively connected to the transmission shaft, and valve mechanism for conducting the fluid from the pump to the motor and for choking the pump to directly couple the driving and transmission shafts together.

9. In a fluid transmission mechanism, a driving shaft, a transmission shaft, a pump comprising two relatively movable elements, one of said elements being connected to the driving shaft and the other of said elements being connected to the transmission shaft, a motor comprising a stationary element and a relatively movable element, said movable element being operatively connected to the transmission shaft, and valve mechanism for conducting the fluid from the pump to the motor and for choking the pump and for by-passing the motor.

10. A fluid transmission mechanism, comprising a driving shaft, a pump casing coupled thereto, provided with cylinders, a transmission shaft having a crank, pistons working in the pump cylinders connected to the crank, a stationary motor casing provided with cylinders, an adjustable crank on the transmission shaft, pistons working in the motor cylinders connected to said adjustable crank, valve mechanism for conducting the fluid from the pump to the motor, means for adjusting the adjustable crank to no-throw position, and means for choking the pump to positively couple the driving and transmission shafts.

11. A fluid transmission mechanism comprising a driving shaft, a pump casing coupled thereto, provided with cylinders, a transmission shaft having a crank, pistons working in the pump cylinders connected to the crank, a stationary motor casing provided with cylinders, an adjustable crank on the transmission shaft, pistons working in the motor cylinders connected to said adjustable crank, valve mechanism for conducting the fluid from the pump to the motor, means for adjusting the adjustable crank to no-throw position, and means for choking the pump and by-passing the motor.

12. A fluid transmission mechanism comprising a driving shaft, a pump casing coupled thereto and provided with cylinders, a transmission shaft having a crank, pistons working in the pump cylinders and connected to the crank, a stationary motor casing provided with cylinders, a second crank on the transmission shaft, pistons working in the motor cylinders and connected to said second crank, and valve mechanism for conducting the fluid from the pump to the motor and operable at will to choke the motor and by-pass the pump.

13. In a fluid transmission mechanism, a driving shaft, a transmission shaft, a pump comprising two relatively movable elements, one of said elements being connected to the driving shaft and the other of said elements being connected to the transmission shaft, a motor comprising a stationary element and a relatively movable element, said movable element being operatively connected to the transmission shaft, a rotary valve for the pump, a rotary valve for the motor, and controlling means disposed between said valves.

14. In a fluid transmission mechanism, a driving shaft, a transmission shaft, a pump comprising two relatively movable elements, one of said elements being connected to the driving shaft and the other of said elements being connected to the transmission shaft, a motor comprising a stationary element and a relatively movable element, said movable element being operatively connected to the transmission shaft, valve mechanisms for the pump and motor, and controlling means disposed between said valve mechanisms for reversing the fluid pressure transmitted to the motor.

15. A fluid transmission mechanism comprising a driving shaft, a pump casing coupled thereto provided with cylinders, a transmission shaft having a crank, pistons working in the pump cylinders connected to the crank, a stationary motor casing provided with cylinders, a second crank on the transmission shaft, pistons working in the motor cylinders connected to said second crank, a rotary valve for the pump, a rotary valve for the motor, and means between said valves for reversing the flow of fluid from the pump to the motor.

16. A fluid transmission mechanism comprising a driving shaft, a pump casing coupled thereto provided with cylinders, a transmission shaft having a crank, pistons working in the pump cylinders connected to the crank, a stationary motor casing provided with cylinders, a second crank on the transmission shaft, pistons working in motor cylinders connected to said second crank, a chambered member revolving in harmony with the transmission shaft, ducts leading from the pump cylinders to said chambered member and communicating alternately with the respective chambers, means for conducting pressure and suction from said chambers comprising a controlling valve, and means for communicating the pressure and suction to the motor cylinders.

17. A fluid transmission mechanism comprising a driving shaft, a pump casing coupled thereto provided with cylinders, a transmission shaft having a crank, pistons working in the pump cylinders connected to the crank, a stationary motor casing provided with cylinders, a second crank on the transmission shaft, pistons working in the motor cylinders connected to said second crank, a chambered member revolving in harmony with the transmission shaft, ducts leading from the pump cylinders to said chambered member and communicating alternately with the respective chambers, means for conducting pressure and suction from said chambers comprising a controlling valve, a second chambered member mounted upon the transmission shaft and connected with said fluid transmitting means, and ducts leading from the motor cylinders communicating alternately with the chambers of the second chambered member.

18. A fluid transmission mechanism comprising a driving shaft, a pump casing coupled thereto provided with cylinders, a transmission shaft having a crank, pistons working in the pump cylinders connected to the crank, a stationary motor casing provided with cylinders, a second crank on the transmission shaft, pistons working in the motor cylinders connected to said second crank, a chambered member revolving in harmony with the transmission shaft, ducts leading from the pump cylinders to said chambered member and communicating alternately with the respective chambers, means for conducting pressure and suction from said chambers comprising a controlling valve, a second chambered member mounted upon the transmission shaft and connected with said fluid transmitting means, ducts leading from the motor cylinders communicating alternately with the chambers of the second chambered member, a shiftable sleeve between the motor ducts and the said second chambered member, said sleeve provided with apertures for permitting communication between the ducts and chambers and provided also with a channel for by-passing certain of the motor cylinders.

19. A fluid transmission mechanism comprising a driving shaft, a pump casing coupled thereto provided with cylinders, a transmission shaft having a crank, pistons working in the pump cylinders connected to the crank, a stationary motor casing provided with cylinders, a second crank on the transmission shaft, pistons working in the motor cylinders connected to said second crank, a rotary valve for the pump, a rotary valve for the motor, connections between said valves comprising a controlling valve, the latter valve including a casing into which the ducts from the pump and motor valves lead, and a valve plug in the casing having passages therein for communicating the pressure and suction from the pressure and suction ducts leading from the pump valve to ducts leading to the motor valve, said plug having also a passage for by-passing the ducts leading to the motor valve.

20. A fluid transmission mechanism comprising a driving shaft, a pump casing coupled thereto provided with cylinders, a transmission shaft having a crank, pistons working in the pump cylinders connected to the crank, a stationary motor casing provided with cylinders, a second crank on the transmission shaft, pistons working in the motor cylinders connected to said second crank, a rotary valve for the pump, a rotary valve for the motor, connections between said valves comprising a controlling valve, the latter valve including a casing into which the ducts from the pump and motor valves lead, and a valve plug in the casing having passages therein for communicating the pressure and suction from the pressure and suction ducts leading from the pump valve to ducts leading to the motor valve, said plug having also a passage for by-passing the ducts leading to the motor valve, in one position of adjustment and by-passing the ducts leading from the pump valve in another position of the plug.

21. A fluid transmission mechanism comprising a driving shaft, a pump casing coupled thereto provided with cylinders, a transmission shaft having a crank, pistons working in the pump cylinders connected to the crank, a stationary motor casing provided with cylinders, a second crank on the transmission shaft, pistons working in the motor cylinders connected to said second crank, a rotary valve for the pump, a rotary valve for the motor, connections between said valves comprising a controlling valve, the latter valve including a valve casing into which the ducts from the pump and motor valves lead, the motor ducts being diametrically disposed about the valve casing, and a valve plug mounted in the valve casing, said plug having passages therein, the mouths of which are spaced 90° about the periphery of the plug for connecting the pump ducts with the motor ducts, and a passage extending diametrically therethrough for by-passing the pump ducts in one position of adjustment and the motor ducts in another position of adjustment.

22. A fluid transmission mechanism comprising an engine shaft, a transmission shaft, a pump element driven by the engine shaft, a coöperating pump element connected to the transmission shaft, a motor connected to the transmission shaft, means for conducting the fluid from the pump to the motor, means for holding the transmission shaft stationary, and means for supplying fluid pressure to the pump to start the engine.

23. A fluid transmission mechanism comprising an engine shaft, a transmission shaft, a pump element driven by the engine shaft, a coöperating pump element connected to the transmission shaft, a motor connected to the transmission shaft, means for conducting the fluid from the pump to the motor, means for choking the motor to hold the transmission shaft stationary, a source of fluid pressure, connections from said source for supplying pressure to the pump to start the engine, and connections from the pump to said source of pressure for charging the latter.

24. In a fluid transmission mechanism, a driving shaft, a transmission shaft, a pump comprising two relatively movable elements, one connected to the driving shaft and the other to the transmission shaft, a motor comprising a stationary element and a relatively movable element, the latter element being operatively connected to the transmission shaft, and valve mechanism for conducting fluid from the pump to the motor, said valve mechanism including means for varying the cut-off of the motor to vary the speed thereof.

25. In a fluid transmission, a driving shaft, a pump casing coupled thereto, a transmission shaft, an element working in the pump casing and connected to the transmission shaft, a stationary motor casing, an element working in the motor casing and also connected with the transmission shaft, and valve mechanism for conducting fluid from the pump to the motor, said valve mechanism including means for varying the cut-off of the motor to vary the speed thereof.

26. A fluid transmission mechanism comprising a driving shaft, a pump casing coupled thereto and provided with cylinders, a transmission shaft having a crank, pistons working in the pump cylinders and connected to the crank, a stationary motor casing provided with cylinders, an adjustable crank on the transmission shaft, means for adjusting the crank to vary its throw, pistons working in the motor cylinders and connected with the adjustable crank, and valve mechanism for conducting fluid from the pump to the motor, said valve mechanism including means for varying the cut-off of the motor cylinders.

27. In a fluid transmission mechanism, a driving shaft, a transmission shaft, a pump comprising two relatively movable elements, one connected to the driving shaft and the other to the transmission shaft, a motor comprising a stationary element and a relatively movable element the latter element being connected to the transmission shaft, valve mechanism for conducting fluid from the pump to the motor and including a motor-valve having a relatively stationary part provided with ports and a relatively shiftable part rotating in harmony with the transmission shaft and having ports adapted to register successively with the ports in said stationary part, and means for shifting the shiftable part to vary the cut-off of the motor.

28. In a fluid transmission mechanism, a driving shaft, a transmission shaft, a pump comprising two relatively movable elements one connected to the driving shaft and the other to the transmission shaft, a motor comprising a stationary element and a relatively movable element, the latter element being connected to the transmission shaft, and valve mechanism for conducting fluid from the pump to the motor, said valve mechanism including means for varying the cut-off of the pump and of the motor.

29. In a fluid transmission mechanism, a driving shaft, a pump casing coupled thereto and provided with cylinders, a transmission shaft having a crank, pistons working in the pump cylinders and operatively connected with the crank, a stationary motor casing provided with cylinders, a second crank on the transmission shaft, pistons working in the motor-cylinders and operatively connected with the said second crank, valve-mechanism for the pump, and rotary valve-mechanism for the motor, connected with the pump valve-mechanism and having a part shiftable at will to vary the cut-off of the motor.

30. In a fluid transmission mechanism, a driving shaft, a pump having a movable element driven by the driving shaft, a motor having cylinders, connections between the pump and the motor cylinders for the flow of a gaseous medium between the two, pistons working in the motor cylinders, a transmission shaft operatively connected with the pistons, and a motor-valve in the aforesaid connections, having a part shiftable at will to vary the cut-off of the motor.

31. In a fluid transmission system, a driving shaft, a transmission shaft, a pump having two relatively movable elements one connected with the driving shaft for actuation thereby and the other with the transmission shaft, a fluid-pressure motor having a stationary element and a relatively movable element, the latter element being operatively connected with the transmission shaft, valve mechanism between pump and the motor, and a gaseous energy-transmitting medium filling the system and having a pressure higher than atmospheric on both the low-pressure and the high-pressure sides of the system.

In testimony whereof I affix my signature in the presence of two subscribing witnesses.

FRANK A. HAYES.

Witnesses:
M. LAWSON DYER,
S. S. DUNHAM.